J. H. SAGER.
AUTOMOBILE BUMPER.
APPLICATION FILED APR. 13, 1917.
1,267,458.
Patented May 28, 1918.
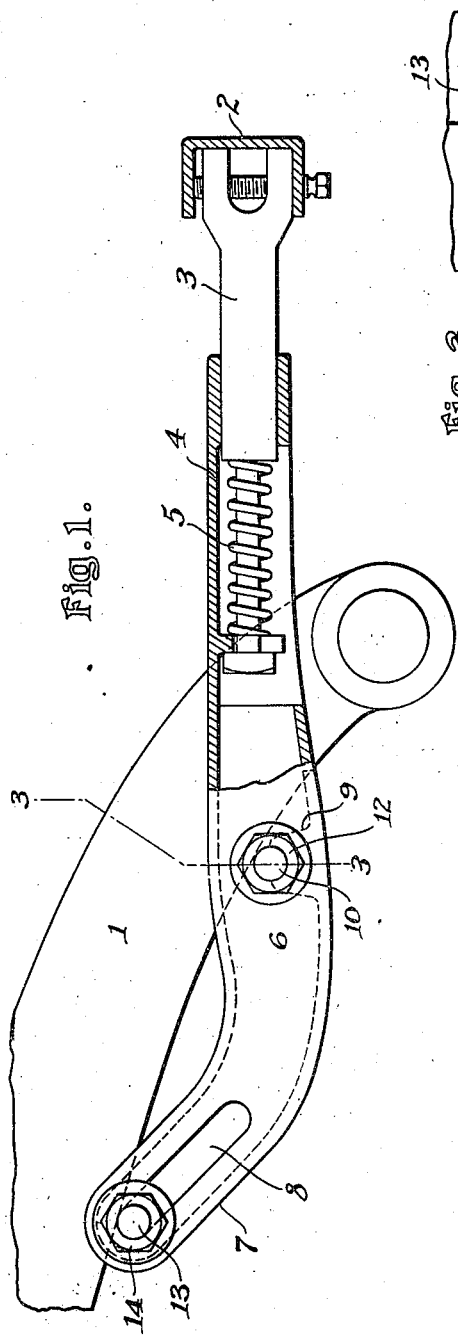
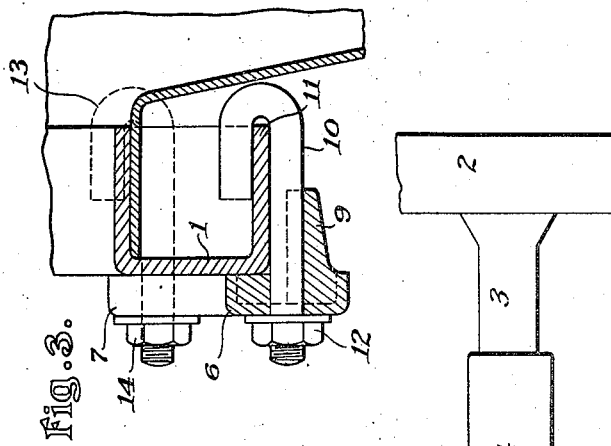
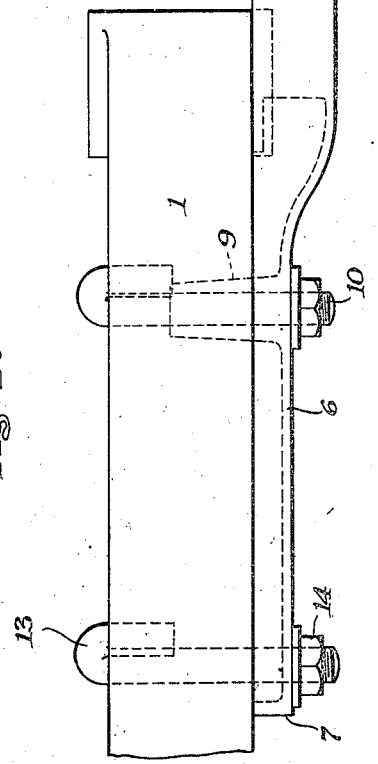
Inventor:
James H. Sager
by Davis & Simms
his attorneys

UNITED STATES PATENT OFFICE.

JAMES H. SAGER, OF ROCHESTER, NEW YORK, ASSIGNOR TO J. H. SAGER COMPANY, OF ROCHESTER, NEW YORK, A CORPORATION.

AUTOMOBILE-BUMPER.

1,267,458.  Specification of Letters Patent.  Patented May 28, 1918.

Application filed April 13, 1917. Serial No. 161,749.

*To all whom it may concern:*

Be it known that I, JAMES H. SAGER, a citizen of the United States, and resident of Rochester, in the county of Monroe and State of New York, have invented certain new and useful Improvements in Automobile-Bumpers, of which the following is a specification.

The present invention relates to automobile bumpers and more particularly to the connection thereof to the frames of the automobiles, an object of this invention being to provide a construction which is adapted to be attached to any automobile frame in which the side bars have curved forward ends, without the necessity of perforating or providing bolt holes in the frame of the vehicle for the attachment of the bumper, the construction being such that a minimum number of parts are necessary in effecting the attachment.

To these and other ends, the invention consists of certain parts and combinations of parts all of which will be hereinafter described, the novel features being pointed out in the appended claim.

In the drawings:—

Figure 1 is a view, partly in section, showing the bumper supporting-arm attached to the curved forward end of a frame bar of a motor vehicle;

Fig. 2 is a plan view of the supporting-arm and the forward end of the frame bar; and Fig. 3 is a section on the line 3—3, Fig. 1.

Referring more particularly to the drawings, 1 indicates the curved forward end of the frame bar of channel form, and 2 the bumper bar which extends transversely of the vehicle and is supported, near opposite ends, by two supporting arms. These supporting arms are, in this instance, each formed of an outer member 3 secured to the bumper bar and guided in an inner member 4, a spring 5 being interposed between the two members to hold them normally extended, but to permit the bumper bar 2 to yield upon impact with any object.

The inner member 4 has, in this instance, a rearward extension 6 formed with a vertical face to engage the vertical face of the frame bar 1. This vertical face of the extension 6 is preferably channeled or curved, in order that it may fit over any rivets or small projections on the side face of the frame bar. The extreme end of the extension 6 is deflected upwardly at 7, and is provided with a slot 8 which lies at an acute angle to the length of the bumper supporting arm. To one side of the slot 8 the extension 6 is provided with a bolt opening, and from the inner side of the extension a grooved or channeled projection 9 extends to lie under the frame bar 1. Extending through the opening in the extension 6, and also through the channel of the extension 9, is a hooked bolt 10, the hook of which engages the lower flange 11 of the channeled frame bar 1, the bolt being provided with a nut 12 coöperating with the face of the extension 6. A hooked bolt 13 also engages the lower flange 11 of the channel bar 1 and operates in the slot 8, being held therein by a nut 14.

By this invention the supporting arms of a bumper may be connected to the side or frame bars of an automobile without utilizing the bolts at the forward ends of the frame bars, and without perforating the frame bars. Each supporting arm employs two hooked bolts which are adjustable relatively to each other so that frame bars of different curvatures may be engaged while maintaining the supporting arm in a horizontal position. These two hooked bolts engage with a flange of the channel bar, and do not interfere with the mud guard or the splash guard of the automobile when the splash or the mud guard is secured to the other flange. The bolts draw the supporting arm firmly against the vertical face of the side bar, and any twisting action due to the shape of the bar and the arrangement of the bolts is prevented by the channel extension 9 which engages the side of the forward bolt as a brace. In attaching the bumper, the forward bolt will act as a pivot while the rear bolt is adjusted in the slot to properly position the bumper on the vehicle frame bar.

What I claim as my invention and desire to secure by Letters Patent is:—

A bumper supporting arm having a vertical channeled face for abutting the vertical side face of a channeled bar with a curved end, and also having a bolt opening and a slot, the length of the slot extending in a direction to intersect a plurality of arcs having the bolt opening as a center, the arm also having an integral channeled projection extending from its channeled face adjacent the bolt opening, a hooked bolt fitted in said opening and channeled projection, and a hooked bolt fitting in said slot.

JAMES H. SAGER.